United States Patent Office 3,148,288
Patented Sept. 8, 1964

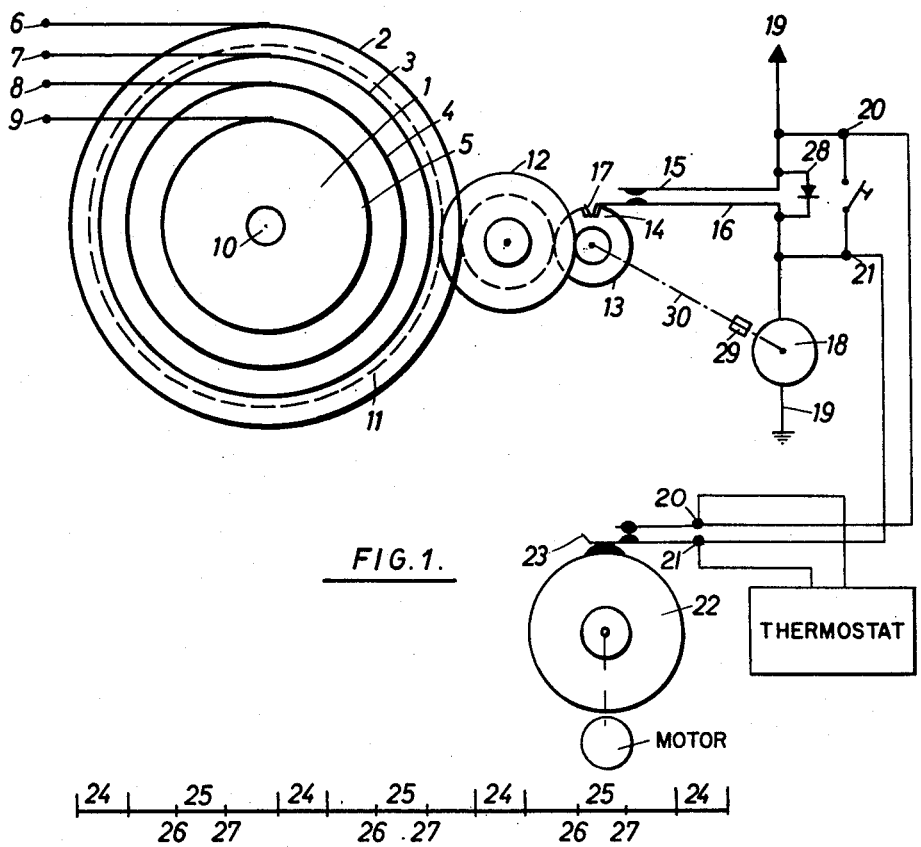

3,148,288
ARRANGEMENT AND APPARATUS FOR OPERATING FULLY AUTOMATIC WASHING MACHINES
Walter Holzer, Meersburg (Bodensee), Germany
Filed Mar. 16, 1960, Ser. No. 15,390
Claims priority, application Germany Mar. 20, 1959
2 Claims. (Cl. 307—141)

The present invention relates to an arrangement and apparatus for operating fully automatic washing machines.

It is the primary object of the invention to provide switching action at maximum accuracy with the lowest possible production cost in fully automatically operated washing machines having a step-by-step rotating cam disc on which the cams for switching the programme are arranged.

The step-by-step rotation of the programme discs is fully automatic washing machines is known. Generally, impulse systems are used for this and the programme switching disc is rotated in uniform switching steps during the whole programme sequence, although during the heating operation the programme switching disc may be stopped.

It is a disadvantage of this known arrangement that the switching cams must be accurately machined. Particularly when operating fully automatic washing machines, comparatively long switching times succeed or follow short switching times. Thus, for example, for filling or emptying the washing container only short times are required for operating the necessary valves, while for spinning or washing much longer times are required. With the uniform progressive advance of the programme disc the accuracy of the switching cams and of the whole control mechanism is dictated by the shortest switching times. Hence production costs are high, or else adjustment is time-consuming and difficult.

It is an object of the invention to avoid these disadvantages and to effect the drive of the programme switching disc in such a manner that despite a relatively low production cost, a very high degree of accuracy is obtained without necessitating great precision in the making of the switching cams.

The solution of the problem according to the invention consists in the fact that the driving motor of the cam discs operates in known manner via an automatic circuit breaking connection, the automatic circuit breaking, however, being affected by means of a secondary cam disc, or the contacts thereof, which is connected with the main cam disc by means of positively operating transmission gearing, whereby starting of the switching movement is effected by actuating bridging contacts of the control contacts.

In this design the conventional mode of operation, consisting in having a cam disc rotating continuously at a constant rate, is abandoned and the drive of the cam disc is effected only briefly until the desired programme section for the washing machine has been turned on. The programme disc is stopped and rotated further until one programme section has completed its function i.e., the hitherto known intermediate switching steps are omited or substantially reduced.

In development of the invention it is useful for the bridging contacts to be actuated by cam discs, which simultaneously cause the change of direction of rotation of the washing machine.

If this switching movement of the programme disc is also combined with the reversal control for the washing machine motor there is obtained the advantage that it is possible to choose a time for the switching movement of the programme disc or the cam disc in which, for example, the washing motor is not running, i.e., it is possible for the switching to be carried out in the reversal interval.

An example of the invention is shown in the drawing. Thus further inventive features will be comprehended from the drawing and the description thereof.

FIG. 1 shows diagrammatically the switching arrangement for the new apparatus.

FIG. 2 shows diagrammatically an impulse diagram as obtained according to the new arrangement.

FIG. 1 illustrates a cam disc 1 such as a program or switching disc which has switching or cam tracks 2, 3, 4, 5. Corresponding switching contacts 6, 7, 8, 9 slide over the cam tracks. Such cam track-contact arrangements are well known per se, see for example my copending U.S. Letters Patent 3,032,617 or U.S. Letters Patents 2,003,852; 2,055,031; 2,703,347 or 2,877,317. It is immaterial whether the switching cam disc 1 actuates the contacts 6–9 by means of physically protruding cams or whether metal contact tracks are provided. The cam disc 1 is located on a shaft 10. This shaft 10 may be driven, but, as is shown here there may also be provided a gear wheel 11 being an element of disc 1 whereby the corresponding spur rim of a transmission gearing wheel 12 may engage herein. A second cam disc 13 is geared to wheel 12 and thus rotates at a much higher speed than the first cam disc 1. Cam disc 13 in the example has a cut-out or recess 14. Contacts 15, 16 are opened or closed depending upon whether a switching tongue 17 engages the recess 14 or the periphery of cam disc 13. A driving motor 18, which in general will be a synchronous motor, is positively connected with the cam disc 13 via a gearing which is not shown in the drawing. The driving motor 18 is connected to mains 19, either when a pair of bridging contacts 20, 21 are closed by a switch associated therewith, or when the switching tongue 17 is abutting against the periphery of the cam disc 13 closing contacts 15 and 16. Upon manually actuating, for example, the switch of bridging contacts 20, 21 the driving motor 18 is energized and starts to run. Tongue 17 leaves recess 14 and closes contacts 15 and 16. The rotary movement is transmitted to the cam disc 13, the transmission gearing 12 and to the cam disc 1. When cam disc 13 has completed one revolution tongue 17 jumps back into recess 14 thus opening contacts 15 and 16. The supply circuit for motor 18 is then interrupted. Only after the bridging contacts 20, 21 are enclosed again for a short time motor 18 will start anew and the cycle recommences. One revolution of disc 13 constitutes correspondingly one step of disc 1.

The actuation of the bridging contacts 20, 21 can be effected by control means such as a thermostat or a further cam disc 22, which is driven by a further synchronous motor. The cam disc 22 is either the disc which simultaneously actuates the contacts for the reversal control, or it is coaxial with such disc. A switching cam 23 on disc 22 inherently closes the switch of bridging contacts 20, 21 for a period of time shorter than the duration of one revolution of cam disc 13.

It is obvious that due to this arrangement, possibly by providing several recesses such as 14 or by a correspondingly reducing speed ratio of cam disc 13 relative to cam disc 22, it is possible to transmit switching steps of any small magnitude to the large cam disc 1.

FIGURE 2, for example, shows a periodically repeated operation whereby the period of time 24 represents the filling or the inlet of the rinsing water and the period of time 25 represents the spinning. In hitherto known driving devices it was customary for the switching steps 26, 27 also to be carried out during the time period 25. The result of this was that a much greater effort was necessary with regard to manufacturing accuracy and adjustment. In the new arrangement only cam discs 22 of suitably varied design, having in some circumstances only one switching cam are required, by means of the speed or diameter of which the switching times for the bridging contacts 20, 21 are established, or momentary switching impulses transmitted, great accuracy of which, however, is not required since they need only cause the starting of the driving motor 18, without the need for great precision.

The arrangement as described can be used for all types of washing machines; the invention is of particular advantage where drives are to be free of vibration and operate free of shocks and impacts, and in which there must not occur any over-spinning due to the contacts closing too quickly, even if extremely short and extremely long switching times are combined.

In order to achieve a rapid stopping of the driving motor and to prevent the switching tongue 17 from leaving the recess 14 by overshooting, a further feature also consists in the fact that the motor has a braking circuit known per se.

A preferred electrical braking circuit is constituted by a one way rectifier 28 connected in parallel to contacts 15, 16. When contacts 15 and 16 open, the armature of the driving motor 18 receives a direct current magnetisation, which causes considerable eddy currents and hence braking.

A further feature is comprised in a coupling 29 to be inserted between motor 18 and the cam discs, similarly to the starter pinion of the driving motor 18, or by electromagnetic means operating against a spring and coupling the drive shaft 30 of driving motor 18 with cam disc 13. When the current is interrupted and contacts 14, 15 are opened coupling 29 disengages motor 18 and shaft 30 by virtue of a spring or the armature shaft provided with a pinion disengaging the connection thereof and driving shaft 30.

Besides the particularly siutable electrical or mechanical braking possibilities it is of course also possible for all known measures to be adopted.

I claim:

1. Control device in automatic washing machines comprising: a first cam disc to be moved in steps and having a plurality of concentrical cam tracks; a plurality of switching contacts cooperating with said cam tracks for performing switching operations in the washing machine; an A.C. motor; electric circuit means for supplying A.C. current to said motor; first contact means inserted in said circuit means for completing a current supply circuit for said motor when closed; a second cam disc having a recess and actuating said first contacts, the recess of said second cam disc having an initial position so as to keep said contact means open but closed when being deflected therefrom whereby said second cam disc makes a complete revolution until said recess reopens said contacts for stopping said motor; gearing means for drivingly connecting said discs to said motor so that a complete revolution of said second disc corresponds to a small angular step of said first disc; second contact means for independently overbridging said first contact means, and switch means for overbridging any of said contact means for starting said motor.

2. Control device in automatic washing machines as set forth in claim 1, wherein a third cam disc driven independent from said other discs actuates said switch means, and means included in said third cam disc for varying the magnitude of the steps.

References Cited in the file of this patent
UNITED STATES PATENTS

| | | |
|---|---|---|
| 2,288,019 | Newman et al. | June 30, 1942 |
| 2,295,057 | Schumert | Sept. 8, 1942 |
| 2,419,431 | Williams | Apr. 22, 1947 |
| 2,599,234 | Clark | June 3, 1952 |
| 2,894,482 | Gorham | July 14, 1959 |
| 3,003,097 | Jennings | Oct. 3, 1961 |
| 3,027,506 | Stenhammer et al. | Mar. 27, 1962 |